(12) United States Patent
Neel et al.

(10) Patent No.: US 11,351,674 B2
(45) Date of Patent: Jun. 7, 2022

(54) PARALLEL REDUNDANT CAPACITIVE SENSING DEVICE

(71) Applicant: FOGALE NANOTECH, Nîmes (FR)

(72) Inventors: Christian Neel, Nîmes (FR); Didier Roziere, Nîmes (FR)

(73) Assignee: FOGALE NANOTECH, Nîmes (FR)

( * ) Notice: Subject to any disclaimer, the term of this patent is extended or adjusted under 35 U.S.C. 154(b) by 47 days.

(21) Appl. No.: 17/053,303

(22) PCT Filed: Feb. 14, 2019

(86) PCT No.: PCT/EP2019/053694
§ 371 (c)(1),
(2) Date: Nov. 5, 2020

(87) PCT Pub. No.: WO2019/219248
PCT Pub. Date: Nov. 21, 2019

(65) Prior Publication Data
US 2021/0362347 A1    Nov. 25, 2021

(30) Foreign Application Priority Data
May 15, 2018 (FR) ...................... 1854038

(51) Int. Cl.
*B25J 13/08* (2006.01)
*G01L 1/14* (2006.01)
*B25J 9/16* (2006.01)

(52) U.S. Cl.
CPC ............. *B25J 13/086* (2013.01); *G01L 1/142* (2013.01); *B25J 9/1676* (2013.01)

(58) Field of Classification Search
CPC ....... B25J 13/086; B25J 9/1676; G01L 1/142; G01L 1/14; G06F 3/0443; G06F 3/0418;
(Continued)

(56) References Cited

U.S. PATENT DOCUMENTS 9,513,321 B2    12/2016 Frangen
9,897,641 B2 *   2/2018 Neel .................... G01R 31/016
(Continued)

FOREIGN PATENT DOCUMENTS

| CN | 206209764 U | 5/2017 |
| DE | 102011114502 A1 | 4/2013 |
| WO | 2012/114008 A1 | 8/2012 |

OTHER PUBLICATIONS

French Search Report received for French Application No. 1854038, dated Jan. 25, 2019.
(Continued)

*Primary Examiner* — Octavia Hollington
(74) *Attorney, Agent, or Firm* — Greer, Burns & Crain, Ltd

(57) ABSTRACT

A capacitive detection device includes a set of several detection electrodes for each carrying out capacitive detection at a detection location. Each detection electrode is formed by at least a first measurement electrode and a second measurement electrode. The device also includes first detection electronics forming, with the first measurement electrodes, a first measurement channel, independent from a second measurement channel formed by second detection electronics with the second measurement electrodes.
Therefore, for each detection location, the detection device carries out at least two redundant and independent detection operations.

17 Claims, 3 Drawing Sheets

(58) Field of Classification Search
CPC ....... G06F 3/044; G01R 27/2605; G05B 9/03; G01V 3/088; H03K 17/955; G01D 5/2405
USPC .................................................. 73/862.626
See application file for complete search history.

(56) References Cited

U.S. PATENT DOCUMENTS

| | | | |
|---|---|---|---|
| 10,976,460 B2* | 4/2021 | Neel | H03K 17/962 |
| 2016/0034102 A1* | 2/2016 | Roziere | G06F 3/0445 |
| | | | 345/174 |
| 2016/0117034 A1 | 4/2016 | Day | |
| 2021/0231718 A1* | 7/2021 | Neel | G01B 7/023 |

OTHER PUBLICATIONS

International Search Report and Written Opinion Received for PCT/EP2019/053694 dated May 17, 2019.

\* cited by examiner

PARALLEL REDUNDANT CAPACITIVE SENSING DEVICE

BACKGROUND

The present invention relates to a device for redundant capacitive detection of an object. It also relates to a detection layer fitted with such a detection device and an item of equipment fitted with such a device or such a layer.

The field of the invention is, non-limitatively, that of interfaces for the capacitive detection of objects in order to detect objects in an environment or in contact with a detection surface.

A first capacitive detection technique is known based on the mutual capacitance formed between two measurement electrodes. A second capacitive detection technique is also known based on the capacitance formed between the object to be detected and a measurement electrode. The invention relates to this second capacitive detection technique.

In general, capacitive detection devices can be used in fields having increased or critical risks. This is the case, for example, in fields where an operator works alongside a robot. It is essential to ensure that the robot does not collide with the operator, due to a malfunction of the capacitive detection device equipping the robot.

This requirement can be met by providing redundant capacitive detection in the detection device equipping the robot, as provided for in document U.S. Pat. No. 9,513,321. The latter provides for using, for each detection location/pixel, two pairs of electrodes, each pair of electrodes carrying out a measurement independently of the other pair of electrodes. Thus, when a pair of electrodes suffers a malfunction, the detection is still ensured by the remaining pair.

However, the solution described in this document is costly and bulky because it requires the use of a significant number of electrodes. In addition, the solution proposed in this document is sensitive to mutual interference between the pairs of electrodes and requires means for isolating pairs of electrodes, or the use of pairs of electrodes in turn.

An aim of the present invention is to overcome the aforementioned drawbacks.

Another aim of the present invention is to propose a redundant capacitive detection device that is simpler, less costly and less bulky Another aim of the present invention is to propose a redundant capacitive detection device having an increased sensitivity allowing detection of objects at a greater distance.

Yet another aim of the present invention is to propose a capacitive detection device that can carry out, for each detection location, simultaneous redundant detections.

SUMMARY

At least one of these aims is achieved with a device for capacitive detection of an object comprising a set of capacitive detection electrodes, each carrying out a capacitive detection for a detection location of a detection surface, each detection electrode comprising at least one first and one second independent electrodes, called measurement electrodes, said device comprising
  first detection electronics for the first measurement electrodes of said assembly, forming with said first measurement electrodes a first detection channel, to polarize said first measurement electrodes at an alternating potential, called excitation potential, different from a ground potential, and measure a signal relative to a capacitance, called electrode-object capacitance, between said first measurement electrode and said object, and
  second detection electronics for the second measurement electrodes of said assembly, forming with said second measurement electrodes a second detection channel, to polarize said second measurement electrodes at said excitation potential and measure a signal relative to an electrode-object capacitance between each second measurement electrode and said object.

The signals relative to an electrode-object capacitance can be, or comprise, for example, signals relative to a capacitance, or an inverse capacitance, or also a distance or a contact between an object and electrodes.

Thus, the detection device according to the invention proposes, for each detection location of a detection surface, a redundant detection with at least two detection channels independent of one another.

Moreover, for each detection location of a detection surface, each detection can be carried out with a single measurement electrode, which is simpler, less costly and less bulky compared with the devices of the state of the art, and in particular with that described in document U.S. Pat. No. 9,513,321.

In addition, the measurement electrodes of a detection location are brought to one and the same alternating potential so that they are electrically invisible between themselves and do not interfere with one another. Thus, the device according to the invention has a simpler architecture, while authorising simultaneous redundant detections for each detection location.

Furthermore, each detection location is monitored by at least two detection channels that are completely independent from one another: thus, the redundancy is ensured over all the detection channel in its entirety, including at the level of the detection electronics, and not only at the level of the measurement electrodes.

Thus, an object in proximity to a detection location will be detected in an identical or substantially identical manner, in particular with one and the same spatial resolution, by the two detection channels.

Under these conditions, the spatial resolution of the detection device is determined by the dimension of the detection locations or of the capacitive detection electrodes, and/or their spacing (for example from centre to centre). This spacing also corresponds in the main to the spacing between identical measurement electrodes of adjacent capacitive detection electrodes.

In the present description, for the sake of brevity, the term "ground potential" denotes a reference potential of the electronics, which can be for example an electrical earth or a ground potential. This ground potential can correspond to an earth potential, or to another potential, connected or not to the earth potential.

In the present application, two alternating potentials are identical at a given frequency when they each comprise an alternating component identical at this frequency. Thus, at least one of the two identical potentials at said frequency can also comprise a direct component, and/or an alternating component having a frequency different from said given frequency.

Similarly, two alternating potentials are different at the working frequency when they do not have an identical AC component at this working frequency.

The first and second measurement electrodes composing a detection electrode can have the same shape or a different shape.

Alternatively, the first and second measurement electrodes composing a detection electrode can be the same size or a different size.

According to an embodiment that is in no way limitative of the device according to the invention, for at least one detection electrode, the first and second measurement electrodes can be juxtaposed in a non-interleaved manner.

According to a particularly advantageous embodiment, for at least one detection electrode:
- one of the first and second measurement electrodes can be at least partially interleaved with the other of said measurement electrodes; or
- the first and second measurement electrodes can be at least partially interleaved with one another.

This embodiment makes it possible to reduce the bulk of a detection electrode.

In addition, this embodiment makes it possible to ensure that the measurement electrodes of a detection electrode detect one and the same object in an identical or substantially identical manner, in particular with a sensitivity and a spatial resolution which is identical or substantially identical.

According to a particularly advantageous embodiment example, for at least one detection electrode the first and second measurement electrodes can have the shape of a comb and interleave with one another.

According to a preferred embodiment, the device according to the invention can also comprise at least one guard electrode for at least a first, respectively second, measurement electrode, polarized at an alternating guard potential identical or substantially identical to the excitation potential at at least one working frequency.

Such a guard electrode can be placed for example opposite a face of one or more measurement electrodes, or in proximity to said electrode. It makes it possible to electrically guard the measurement electrode and thus increase the detection range and accuracy of detection, by protecting said measurement electrode from parasitic coupling capacitances in particular.

At least one guard electrode can be common to all of the measurement electrodes forming a detection electrode, which makes it possible to simplify the architecture of the detection device.

Alternatively, or in addition, at least one guard electrode can form a guard plane common to several, in particular to all, the detection electrodes. Such an architecture makes it possible to simplify even further the device according to the invention.

Alternatively, at least one guard electrode can be common to several, in particular to all, the first, respectively second, measurement electrodes. It is thus possible to guard the measurement electrodes of a measurement channel, independently of the other measurement channel, which allows for a greater robustness of redundant detection.

The measurement and/or guard electrode or electrodes can be produced from any conductive material. They can in particular be produced with deposition or a metal layer.

Alternatively, at least one, in particular each, of the measurement electrodes can be produced from a transparent material.

The guard electrode can also be produced from a transparent material.

The connecting tracks of at least one, in particular each, of the electrodes can also be transparent.

For example, the electrode or electrodes can be produced from indium tin oxide (ITO).

Advantageously, the detection electronics of each detection channel can comprise a measurement module supplying a detection signal relative to one or more capacitances, called electrode-object capacitances, between one or more measurement electrodes of said detection channel and one or more objects in proximity to, or in contact with, said measurement electrode or electrodes.

Such a measurement module can be digital or analogue and can for example be arranged to produce a detection signal in the form of a voltage or a numerical signal proportional, or inversely proportional, to the electrode-object capacitance for each, or a group of, measurement electrode(s) of a measurement channel.

Each detection channel can also comprise at least one calculation module configured to determine a distance or an item of distance information, and/or a contact or an item of contact information, between the object and the measurement electrode or electrodes, as a function of the electrode-object capacitance measurement between said measurement electrode and the object.

This calculation module can for example comprise or be produced in the form of a microcontroller, or an FPGA.

The calculation of the distance and/or of the contact can be carried out by taking into account the detection signal or as a function of a digitized version of said detection signal, or of another numerical or analogue signal deduced from said detection signal, for example by filtering of said detection signal at the working frequency.

The at least one calculation module can determine said distance, or said contact, by calculation or by comparison with a previously established reference table.

The at least one calculation module can also determine said distance, or said contact, directly as a function of a previously provided relationship.

The distance information can also be, or comprise, an item of comparison information with respect to one or a plurality of distance thresholds. It can also be used for example to trigger safety procedures, such as for example slowing, or stopping, or an avoidance procedure, of a machine or a robot when an obstacle or a human operator is located at a distance below a threshold.

The device according to the invention can also comprise a control module arranged to compare signals measured respectively by the first detection electronics and the second detection electronics.

This control module can be an electronic and/or digital module separate from the detection electronics.

It can also be produced by components or functionalities (for example implemented in a microcontroller) of one or of each electronic detection unit, which compares measurement signals originating from this detection channel with those originating from the other detection channel.

Thus, the control module can for example be implemented in the calculation modules of the first and second detection electronics, in the form of two independent control sub-modules which compare measurement signals originating from their respective detection channel with those originating from the other detection channel. This arrangement allows optimal operational redundancy and safety since each detection channel is monitored by two independent control sub-modules.

The control module can be arranged for example to compare the distances, or the items of distance and/or contact information, obtained.

The control module can in particular determine differences between the measurement signals originating respectively from the detection channels and thus detect failures of the capacitive detection device. It can then be used for example to trigger safety procedures, such as for example slowing, or stopping, in the case of detection of a difference between measurement signals of different detection channels greater than a predetermined threshold.

Advantageously, at least one, in particular each, of the first and second detection channels can comprise a polling means to poll at least a part, or each, of the measurement electrodes of said detection channel sequentially.

Thus, the architecture of the detection electronics is simplified for the, or each, detection channel. For example, a measurement module, and a calculation module can be common to several, or even all the measurement electrodes of a measurement channel.

Such a polling means can comprise a switch connecting the measurement electronics of a measurement channel, sequentially or in turn, to each measurement electrode, or to each group of measurement electrodes of each measurement channel.

This switch can also be arranged so as to connect the measurement electrodes respectively, either to the measurement electronics, or to the guard potential. Thus, the measurement electrodes which are not connected to the measurement electronics, and are thus in the non-measuring state, behave as guard elements with respect to measurement electrodes in the measuring state.

In general, for each detection channel, the detection electronics can be digital, or analogue, or also a combination of digital and analogue means.

The detection electronics of a detection channel can be identical to, or different from, the detection electronics of another detection channel.

According to an embodiment, the detection electronics of at least one, in particular each, detection channel can comprise an operational amplifier (OA) or a circuit producing an operational amplifier, functioning as a transimpedance or charge amplifier, in which
- a first input, for example an inverting input, is connected to one or more measurement electrodes of said detection channel, directly or via a polling means;
- a second input, for example a non-inverting input, is connected to an oscillator supplying an excitation signal;
- the output is looped to said first input via an impedance, and in particular via a capacitor.

In this configuration, the output of the OA supplies a voltage $V_s$, the amplitude of which is proportional to the electrode-object capacitance between said measurement electrode and the object.

The output of the operational amplifier can be connected, directly or indirectly, to a module for measuring the voltage $V_s$, which itself is linked to one or more calculation modules, such as the calculation module or modules described above.

This module for measuring the voltage $V_s$ can comprise a demodulation, such as a synchronous demodulation at a working frequency of the alternating excitation potential, or an amplitude detection.

Advantageously, the detection electronics of each detection channel can be at least partially electrically referenced to the alternating excitation potential.

The device according to the invention can also comprise an oscillator supplying the alternating excitation potential for the first and second detection channel, and the guard potential if required.

The oscillator can be common to all the detection channels, and to the at least one guard electrode.

Alternatively, each detection channel can comprise an individual oscillator, for better redundancy. In this case, the oscillators of the detection channels are preferentially synchronized to avoid one detection channel interfering with another detection channel, and preferably supplying an alternating potential of the same frequency and of the same amplitude.

According to yet another aspect of the invention, a detection layer is proposed for an item of equipment, fitted with a detection device according to the invention.

The detection device according to the invention, in particular the detection electrodes, is(are) able to be integrated in the detection layer.

The detection layer can be integrated in the item of equipment.

Alternatively, the detection layer can be independent of the item of equipment and attached to this item of equipment in a removable or detachable manner.

According to an embodiment, the detection layer according to the invention can comprise, along a face, a plurality of detection electrodes distributed according to a matrix arrangement, each of said detection electrodes comprising at least one first and one second measurement electrodes juxtaposed and/or interleaved.

Such an arrangement makes it possible in particular to obtain a spatial resolution that is identical or substantially identical for the detection of objects with the two detection channels.

According to another embodiment, the detection layer according to the invention can comprise:
- along a face, at least one detection electrode, and
- along another face, at least one guard electrode.

The detection layer can comprise a resilient dielectric layer, such as a printed circuit board substrate, supporting along one or both faces, electrodes in the form of depositions or metal layers.

The detection layer can of course comprise protection or trim layers over the measurement and/or guard electrodes.

The detection layer can have the form of a rigid or resilient trim element.

The detection layer can have the form of a trim element or a skin, or a textile trim.

The detection layer can also have the form of a trim part or element that is tubular in shape, such as for example a casing or a cover.

According to another aspect of the same invention, an item of equipment fitted with a detection device according to the invention, or a detection layer according to the invention, is proposed.

The item of equipment can have for example the form of a fixed or mobile robot, of humanoid shape or other, or in the form of a robotized handling arm, or a robot arm or a robot segment, or also of an autonomous vehicle (AGV).

According to embodiments, the detection device, respectively the detection layer, can be integrated in a component part of a component part of the equipment, such as a casing or a cover.

Alternatively, the detection device, respectively the detection layer, can be independent of a component part of the equipment and be placed in/on a component part of said item of equipment in a detachable or removable manner.

BRIEF DESCRIPTION OF THE DRAWINGS

Other advantages and characteristics will become apparent on examination of the detailed description of non-limitative examples and from the attached drawings in which.

DETAILED DESCRIPTION

It is well understood that the embodiments that will be described hereinafter are in no way limitative. Variants of the invention can in particular be envisaged comprising only a selection of characteristics described hereinafter in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements that are common to several figures retain the same reference.

Figure 1:
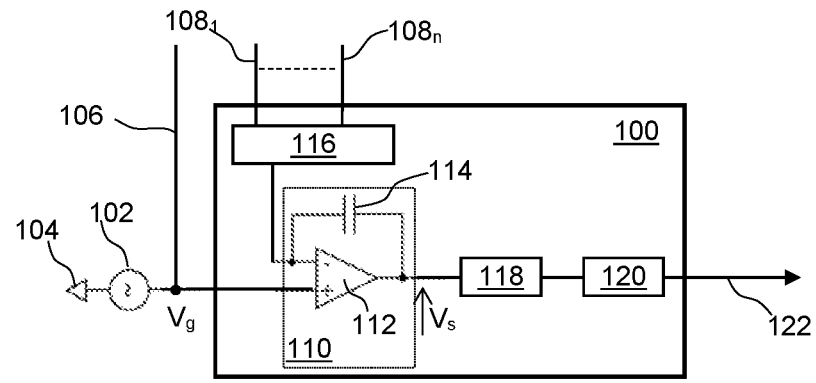
FIG. 1 is a diagrammatic representation of a non-limitative embodiment of capacitive detection electronics that can be utilized in the device according to the invention.

FIG. 1 is a diagrammatic representation of a non-limitative embodiment of capacitive detection electronics that can be utilized in the device according to the invention.

The detection electronics 100, shown in FIG. 1, can be produced in an analogue or digital form, or an analogue/digital combination.

The detection electronics 100 receives an alternating excitation voltage, denoted $V_G$, from an oscillator 102, referenced to a ground potential 104.

The voltage $V_G$ is used as guard potential in order to polarize one or more guard electrodes via a line or several lines 106, and as excitation potential in order to polarize "n" measurement electrodes via "n" lines $108_1$-$108_n$, where n≥1.

The detection electronics 100 comprises a current, or charge, amplifier 110 represented by an operational amplifier (OA) 112 and a feedback capacitor 114 looping the output of the OA 112 to the "−" input of the OA 112.

In addition, in the example shown, the "+" input of the OA 112 receives the voltage $V_G$ and the "−" input of the OA 112 is provided in order to be connected to each detection electrode via a polling means 116, which can be for example a switch, so as to poll a set of "n" measurement electrodes individually in turn. The lines $108_1$-$108_n$ are all connected to the polling means 116.

Under these conditions, the charge amplifier 110, and in particular the OA 112, supplies at the output a voltage $V_s$ at an amplitude proportional to the coupling capacitance $C_{eo}$, called electrode-object capacitance, between the measurement electrode connected to the "−" input thereof and an object in proximity, or in contact, with said measurement electrode.

The detection electronics 100 can also comprise a signal conditioner 118 making it possible to obtain a signal representative of the sought coupling capacitance $C_{eo}$. This signal conditioner 118 can comprise, for example, a synchronous demodulator for demodulating the signal with respect to a carrier wave, at a working frequency. The signal conditioner 118 can also comprise an asynchronous demodulator or an amplitude detector. This signal conditioner 118 can of course be produced in an analogue and/or digital form (microprocessor), and comprise all necessary means for filtering, conversion, processing etc.

The signal conditioner 118 measures and supplies the value of the voltage $V_S$.

The current or charge amplifier 110 and the signal conditioner 118 thus constitute a measurement module which supplies a signal relative to the electrode-object coupling capacitance $C_{eo}$.

The detection electronics 100 also comprises a calculation module 120 arranged in order to determine a distance or an item of distance information, and/or a contact or an item of contact information, between the measurement electrode and the object, as a function of the signal with respect to the coupling capacitance $C_{eo}$ originating from the signal conditioner 118.

This calculation module 120 can for example comprise or be produced in the form of a microcontroller, or an FPGA.

The calculation module can also supply other items of information, such as triggering of alarms or safety procedures, when for example the measured distances are below the predetermined distance thresholds.

Of course, the measurement electronics 100 can comprise components other than those described.

The detection electronics 100, or at least its sensitive part with the charge amplifier 110, can be referenced (or supplied by electrical power supplies referenced) to the guard potential $V_G$, in order to minimize the parasitic capacitances.

The detection electronics 100 can also be referenced, more conventionally, to the ground potential 104.

The detection electronics supplies at an output 122 a signal relative to the capacitance $C_{eo}$, or to the distance between the object and the measurement electrode.

Figure 2:
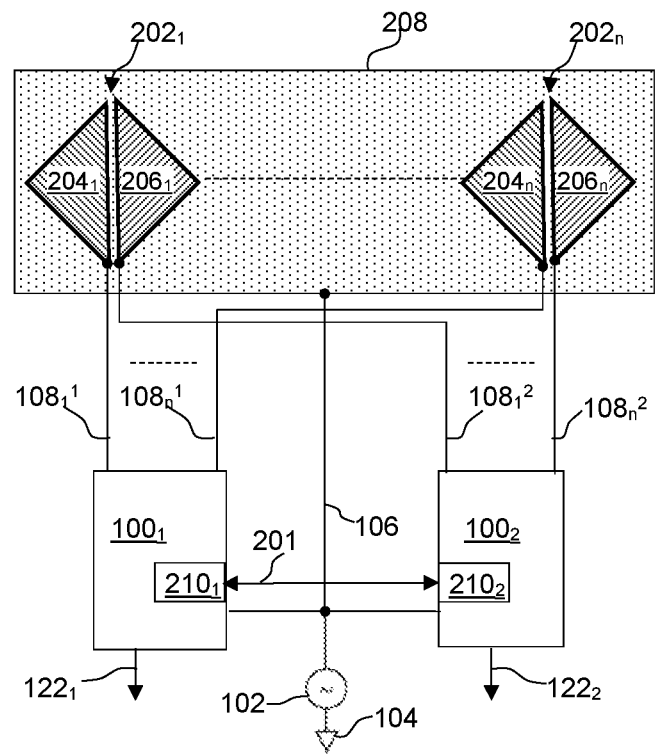
FIG. 2 is a diagrammatic representation of a non-limitative embodiment example of a detection device according to the invention.

FIG. 2 is a diagrammatic representation of a non-limitative embodiment example of a redundant capacitive detection device according to the invention.

The detection device 200, shown in FIG. 2, comprises an assembly of several detection electrodes $202_1$-$202_n$. The detection electrodes $202_1$-$202_n$ are shown along a line for the sake of clarity. Of course, the detection electrodes $202_1$-$202_n$ can be placed in the form of a matrix, for example of detection electrodes $202_1$-$202_n$ in a square or diamond shape, or according to any configuration other than that shown in FIG. 2.

The detection electrodes $202_1$-$202_n$ are each associated with a detection location, or pixel, on a detection surface.

Each detection electrode $202_i$ is formed by two measurement electrodes: a first measurement electrode $204_i$ and a second measurement electrode $206_i$. The two measurement electrodes $204_i$ and $206_i$, forming a detection electrode $202_i$, are independent of one another, and are used to carry out a double detection at one and the same detection location/pixel, namely the location associated with the detection electrode $206_i$. To this end, a signal relative to the electrode-object capacitance is measured independently for each measurement electrode $204_i$ and $206_i$, for example according to the principle described with reference to FIG. 1.

The detection device 200 also comprises first detection electronics $100_1$ associated with all the first measurement electrodes $204_1$-$204_n$ of all the detection electrodes $202_1$-$202_i$.

The first detection electronics $100_1$ forms with the first measurement electrodes $204_1$-$204_n$ a first detection channel.

The first detection electronics $100_1$ can be identical to, or operate on the principle of, the detection electronics $100$ in FIG. 1.

The first detection electronics $100_1$ is connected to all the first measurement electrodes $204_1$-$204_n$ by virtue of the lines $108_1^1$-$108_n^1$. The first measurement electronics supplies at its outlet $122_1$ a detection signal relative to the electrode-object capacitance $C_{eo}$, or to the electrode-object distance, for each of the first measurement electrodes $204_1$-$204_n$.

The detection device 200 also comprises second detection electronics $100_2$ associated with all the second measurement electrodes $206_1$-$206_n$ of all the detection electrodes $202_1$-$202_n$.

The second detection electronics $100_2$ forms with the second measurement electrodes $206_1$-$206_n$ a second detection channel, independent of the first detection channel.

The second detection electronics $100_2$ can be identical to, or operate on the principle of, the detection electronics $100$ in FIG. 1.

The second detection electronics $100_2$ is connected to all the second measurement electrodes $206_1$-$206_n$ by virtue of the lines $108_1^2$-$108_n^2$. The second measurement electronics supplies at its outlet $122_2$ a detection signal relative to the electrode-object capacitance $C_{eo}$, or to the electrode-object distance, for each of the second measurement electrodes $206_1$-$206_n$.

Thus, each of the first and second detection channels supplies a measurement, and a detection, which is independent for each detection location. As a result, the device 200 ensures a redundant capacitive detection for each detection location.

The detection device 200 also comprises a control device 210 one of the functions of which is to verify the correct operation of the assembly and to detect failures of one or the other detection channels.

In the embodiment mode shown, this control module 210 comprises two control sub-modules, $210_1$ and $210_2$, implemented respectively in the calculation modules 120 of the first and second detection channels. The control sub-modules $210_1$, $210_2$ are arranged to compare measurement signals originating from their respective detection channel with those originating from the other detection channel.

The control module 210 can thus determine differences between the measurement signals originating respectively from the first and the second detection channel, which reveal failures of at least one of the detection channels. In the case of a difference of measurement between the channels above a predetermined threshold, the control module 210 can trigger safety procedures, such as for example slowing or stopping of the system. This triggering can be carried out via calculation modules 120, or by outputs that are part of the control module. It should be noted that a safety procedure can thus be triggered as soon as a difference is detected between the channels, without seeking to determine which of the channels is faulty.

According to an advantageous aspect of the invention, the detection channels can be used simultaneously, in a synchronous or asynchronous manner, as they do not interfere with one another. In particular, a synchronous use makes it possible to obtain two measurements simultaneously under identical conditions and thus to detect failures more quickly and effectively.

Of course, the measurement channels can also be used sequentially or in turn. In this latter case, a communication line can be provided between the detection channels to ensure a detection in turn.

The device 200 also comprises a guard electrode 208, forming a common guard plane for all of the detection electrodes $202_1$-$202_n$, and thus for all of the first and second measurement electrodes.

The guard electrode 208 is polarized at the guard potential $V_G$, for example via the line 106, as described with reference to FIG. 1.

Alternatively, the detection device according to the invention can utilize a guard electrode that is:

individual for each measurement electrode within a detection electrode, or common to the measurement electrodes of one and the same detection electrode; or common to several, or to all, of the first measurement electrodes, or also common to several, or to all, of the second measurement electrodes.

In FIG. 2, non-limitatively, each detection electrode $202_i$ is formed by two measurement electrodes.

Of course, according to a general formula, each detection electrode $202i$ can be formed by "k" measurement electrodes, with k≥2. In this case, the redundant capacitive detection device according to the invention can comprise "k" independent detection electronics $100_1$-$100_k$, each associated with one of the measurement electrodes of each detection electrode $202_i$.

In addition, in FIG. 2, each detection electrode $202_i$ is formed by two juxtaposed measurement electrodes in the shape of a triangle. If course, the shape and the arrangement of the measurement electrodes of a detection electrode are not limited to this example.

Figure 3:
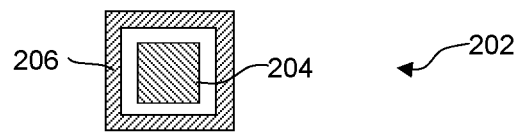
FIGS. 3-7 are diagrammatic representations of non-limitative embodiment examples of a detection electrode that can be used in a detection device according to the invention.

FIG. 3 gives an embodiment example of a detection electrode that can be implemented in a redundant capacitive detection device according to the invention.

In the example described in FIG. 3, the detection electrode 202 is formed by a first measurement electrode 204, entirely interleaved with a second measurement electrode 206. The second measurement electrode 206 completely surrounds the first measurement electrode 204. The connection tracks can then be produced on another layer of conductor.

Figure 4:
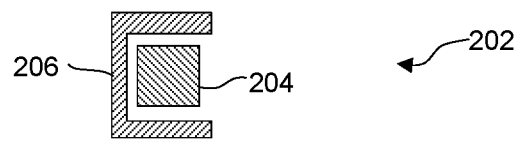

FIG. 4 gives an embodiment example of a detection electrode that can be implemented in a redundant capacitive detection device according to the invention.

In the example described in FIG. 4, the detection electrode 202 is formed by a first measurement electrode 204, entirely interleaved with a second measurement electrode 206. The second measurement electrode 206 does not completely surround the first measurement electrode and has the shape of a "C".

Figure 5:
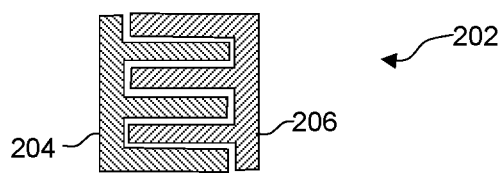

FIG. 5 gives an embodiment example of a detection electrode that can be implemented in a redundant capacitive detection device according to the invention.

In the example described in FIG. 5, the detection electrode 202 is formed by a first measurement electrode 204, and a second measurement electrode 206 which are interleaved with one another. Each measurement electrode has the shape of a comb. The combs are interleaved with one another.

Figure 6:
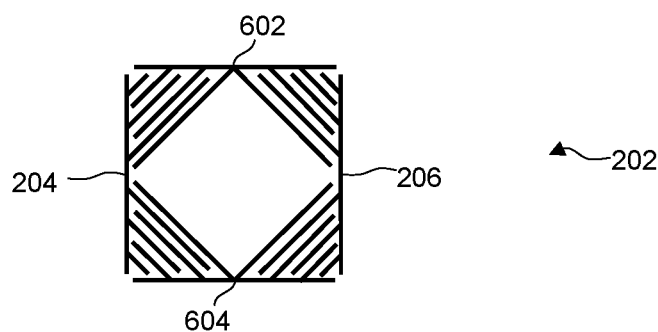

FIG. 6 gives an embodiment example of a detection electrode that can be implemented in a redundant capacitive detection device according to the invention.

In the example described in FIG. 6, the detection electrode 202 is formed by four measurement electrodes 204, 206, 602 and 604 which are interleaved with one another in threes. The measurement electrodes 204 and 206 are identical and face one another. The measurement electrodes 602 and 604 are identical and face one another.

Each measurement electrode is interleaved with the two measurement electrodes which are juxtaposed to it.

Figure 7:

FIG. 7 gives an embodiment example of a detection electrode that can be implemented in a redundant capacitive detection device according to the invention.

In the example described in FIG. 7, the detection electrode 202 is formed by a first measurement electrode 204, juxtaposed with a second measurement electrode 206.

As above, the examples of detection electrodes described in FIG. 3 to FIG. 7 can be arranged to cover a detection surface according to matrix, radial etc. arrangements.

Figure 8:
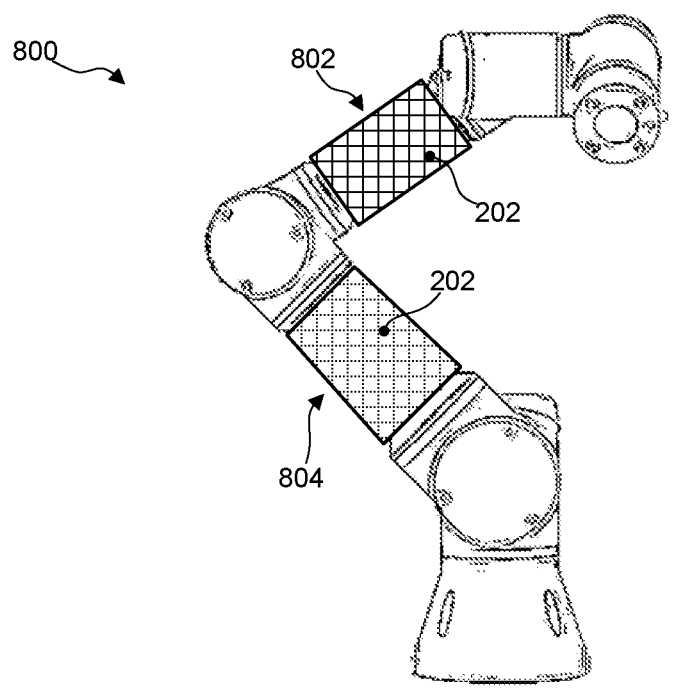
FIG. 8 is a diagrammatic representation of a non-limitative embodiment example of a robot equipped with a detection device according to the invention.

FIG. 8 is a diagrammatic representation of a robot equipped with trim elements according to the invention.

The robot 800 shown in FIG. 8, is a robotized arm comprising several segments that are articulated and connected to one another by rotary articulations.

The robot 800 comprises two trim elements 802 and 804 placed on two segments of the robot 800.

Each trim element 802-804 comprises a detection device according to the invention, such as for example the detection device 200 in FIG. 2.

The detection electronics of the detection devices equipping the trim elements 802 and 804 can be separate, or partially or completely common.

The detection electrodes 202 of each detection device equipping the trim elements 802-804 are integrated in the thickness of said trim element, or arranged on a face or the faces of said trim element 802-804.

The trim elements 802-804 also comprise a guard layer to avoid parasitic couplings between the electrodes and the structure of the robot.

The trim elements 802-804 are used either in place of an original trim element of the robot, or in addition to an original trim element.

Of course, the invention is not limited to the examples that have just been described, and numerous modifications may be made to these examples without exceeding the scope of the invention.

The invention claimed is:

1. A device for capacitive detection of an object, comprising: a set of capacitive detection electrodes each carrying out a capacitive detection for a detection location of a detection surface, each detection electrode comprising at least one first and one second independent electrodes, called measurement electrodes, said also comprising:
   first detection electronics for the first measurement electrodes of said assembly, forming with said first measurement electrodes a first detection channel, to polarize said first measurement electrodes at an alternating potential, called excitation potential, different from a ground potential, and measure a signal relative to a capacitance, called electrode-object capacitance, between each first measurement electrode and said object; and
   second detection electronics for the second measurement electrodes of said assembly, forming with said second measurement electrodes a second detection channel, to polarize said second measurement electrodes at said excitation potential and measure a signal relative to an electrode-object capacitance between each second measurement electrode and said object.

2. The device according to claim 1, characterized in that, for at least one detection electrode, the first and second measurement electrodes are juxtaposed in a non-interleaved manner.

3. The device according to claim 1, characterized in that, for at least one detection electrode:
   one of the first and second measurement electrodes is at least partially interleaved with the other of said measurement electrodes; or
   the first and second measurement electrodes are at least partially interleaved with one another.

4. The device according to claim 1, characterized in that it also comprises at least one guard electrode for at least a first, respectively second measurement electrode, polarized at an alternating guard potential identical or substantially identical to the excitation potential at least one working frequency.

5. The device according to claim 4, characterized in that at least one guard electrode:
   is common to all the measurement electrodes forming a detection electrode; and/or
   is common to several first, respectively second measurement electrodes, and/or
   forms a guard plane common to several, in particular all, the detection electrodes.

6. The device according to claim 1, characterized in that the detection electronics of each detection channel comprises a measurement module supplying a detection signal relative to one or more capacitances, called electrode-object capacitances, between one or more measurement electrodes of said detection channel and one or more objects in proximity to, or in contact with, said measurement electrode or electrodes.

7. The device according to claim 1, characterized in that it also comprises a control module arranged to compare signals measured respectively by the first detection electronics and the second detection electronics.

8. The device according to claim 1, characterized in that at least one of said first and second detection channels comprises a polling means to poll at least a part of the measurement electrodes of said detection channel sequentially.

9. The device according to claim 1, characterized in that the detection electronics of each detection channel is at least partially electrically referenced to the alternating excitation potential.

10. The device according to claim 1, characterized in that it comprises an oscillator supplying the alternating excitation potential for the first and second detection channel, and the guard potential ($V_G$) if required.

11. A detection layer, for an item of equipment, fitted with a detection device according claim 1.

12. The detection layer according to claim 11, characterized in that it comprises, along a face, a plurality of detection electrodes distributed according to a matrix arrangement, each of said detection electrodes comprising at least a first and a second measurement electrodes juxtaposed and/or interleaved.

13. The detection layer according to claim 11, characterized in that it comprises, along a face, at least one detection electrode, and along another face, at least one guard electrode.

14. The detection layer according to claim 11, characterized in that it has the form of a rigid or resilient trim element.

15. An item of equipment fitted with a detection layer according to claim 11.

16. An item of equipment fitted with a detection device according to claim 1.

17. The item of equipment according to claim 16, characterized in that it is a robot, a robotized handling arm or a robot segment.

* * * * *